US006971608B2

(12) United States Patent
Harrington et al.

(10) Patent No.: US 6,971,608 B2
(45) Date of Patent: Dec. 6, 2005

(54) INTEGRATED TRANSPORT SYSTEM AND METHOD FOR OVERHEAD STOWAGE AND RETRIEVAL

(75) Inventors: Anthony A. Harrington, Granite Falls, WA (US); Paul M. Wojciechowski, Bothell, WA (US)

(73) Assignee: The Boeing Company, Chicago, IL (US)

( * ) Notice: Subject to any disclaimer, the term of this patent is extended or adjusted under 35 U.S.C. 154(b) by 11 days.

(21) Appl. No.: 10/708,955

(22) Filed: Apr. 2, 2004

(65) Prior Publication Data

US 2005/0218265 A1 Oct. 6, 2005

(51) Int. Cl.$^7$ ................................................ B64C 1/20
(52) U.S. Cl. ................................................ 244/118.5
(58) Field of Search .......................... 244/118.1, 118.2, 244/118.5, 118.6

(56) References Cited

U.S. PATENT DOCUMENTS

| | | | | |
|---|---|---|---|---|
| 3,701,396 A | * | 10/1972 | House .......................... | 188/21 |
| 4,055,317 A | * | 10/1977 | Greiss ...................... | 244/118.5 |
| RE32,176 E | * | 6/1986 | Vernon ..................... | 244/118.5 |
| 4,653,707 A | * | 3/1987 | Hamilton et al. ......... | 244/137.2 |
| 4,660,787 A | * | 4/1987 | Sprenger et al. ......... | 244/118.5 |
| 5,159,994 A | * | 11/1992 | Luria .......................... | 186/40 |
| 5,205,515 A | * | 4/1993 | Luria ...................... | 244/118.5 |
| 5,314,143 A | * | 5/1994 | Luria ....................... | 244/118.1 |
| 5,322,244 A | * | 6/1994 | Dallmann et al. ....... | 244/118.5 |
| 5,496,000 A | * | 3/1996 | Mueller .................... | 244/118.1 |
| 5,727,654 A | * | 3/1998 | Roessner et al. ............. | 186/40 |
| 5,759,005 A | * | 6/1998 | Roessner et al. ........... | 414/280 |
| 6,059,229 A | * | 5/2000 | Luria ...................... | 244/118.1 |
| 6,073,883 A | | 6/2000 | Ohlmann et al. | |
| 6,290,181 B1 | * | 9/2001 | Gadd et al. ................. | 244/159 |
| 6,305,643 B1 | * | 10/2001 | Sankrithi ................. | 244/118.1 |
| 6,340,136 B1 | * | 1/2002 | Luria ...................... | 244/118.1 |
| 6,412,603 B1 | * | 7/2002 | Nervig et al. ............... | 187/267 |
| 6,454,208 B1 | * | 9/2002 | Nervig et al. ............. | 244/118.1 |
| 6,464,169 B1 | * | 10/2002 | Johnson et al. .......... | 244/118.5 |
| 6,547,183 B2 | * | 4/2003 | Farnsworth .............. | 244/118.1 |
| 6,616,098 B2 | | 9/2003 | Mills | |
| 6,663,043 B1 | * | 12/2003 | Luria ...................... | 244/118.1 |
| 6,808,142 B2 | * | 10/2004 | Oki ......................... | 244/118.1 |
| 2002/0148928 A1 | * | 10/2002 | Oki ......................... | 244/118.1 |
| 2003/0025036 A1 | * | 2/2003 | Farnsworth .............. | 244/118.1 |
| 2004/0188564 A1 | * | 9/2004 | Boe et al. ................. | 244/118.1 |

\* cited by examiner

Primary Examiner—Michael J. Carone
Assistant Examiner—Stephen A. Holzen
(74) Attorney, Agent, or Firm—Vincent C. Ilagan; Artz & Artz, P.C.

(57) ABSTRACT

One advantageous embodiment of the present invention is an integrated transport system (14) for moving an object (20) in an aircraft (10) between a main cabin (16) and an overhead cabin (18) via a shaft (24) in connection therebetween. This integrated transport system (14) includes a single-unit gantry-lift device (42) with an object carrier (32) for receiving the object (20). This object carrier (32) has one or more restraint members (34, 38) for securing the object (20) in the object carrier (32) and preventing the object (20) from inadvertently tipping or falling out of the object carrier (32). In this embodiment, the single-unit gantry-lift device (42) further includes a lift device (46) for moving the object carrier (32) generally along a longitudinal axis (22) of the shaft (24) and a gantry device (44) for moving the object carrier (32) generally along a first axis (26) of the overhead cabin (18) and/or a second axis (28), which is disposed generally perpendicular to the first axis (26).

29 Claims, 9 Drawing Sheets

INTEGRATED TRANSPORT SYSTEM AND METHOD FOR OVERHEAD STOWAGE AND RETRIEVAL

BACKGROUND OF INVENTION

The present invention relates generally to aircrafts, and more particularly to an integrated transport system and method for moving an object between a main cabin and an overhead cabin.

Aircraft manufacturers are well known for producing aircrafts having constructions that maximize the use of space within those aircrafts. For example, certain commercial airplanes can have automated elevator systems for vertically moving galley carts between a main deck galley and a lower lobe of the airplane. In this way, the galley carts can be stored in the lower lobe, and the main-deck passenger cabin can be sized larger than it otherwise would have been if those carts were stored on the main deck. This construction is beneficial because it can increase the number of passenger seats, maintain the number of seats while increasing the size of the passenger seats, increase the room for the passengers and crewmembers to move about the aircraft, provide various other advantages, and/or provide any combination thereof.

Therefore, it would be desirable to further improve the use of space within an aircraft and the benefits associated therewith.

SUMMARY OF INVENTION

One embodiment of the present invention is an integrated transport system for moving an object in an aircraft between a main cabin and an overhead cabin via a shaft in connection therebetween. This integrated transport system includes a single-unit gantry-lift device with an object carrier for receiving the object. This object carrier has one or more restraint members for securing the object in the object carrier and preventing the object from tipping. The single-unit gantry-lift device further includes a lift device for moving the object carrier generally along a of longitudinal axis of the shaft and a gantry device for moving the object carrier generally along a first axis of the overhead cabin and/or a second axis, which is disposed generally perpendicular to the first axis.

One advantage of the invention is that an integrated transport system is provided that can safely transfer a substantially heavy object with a substantially low risk of the object tipping and falling therefrom.

Another advantage of the present invention is that an integrated transport system is provided that can safely move an object with sufficiently quick speed.

Yet another advantage of the present invention is that an integrated transport system is provided with a simple construction for providing ease of manufacture, minimizing the costs associated therewith, and facilitating the installation of the integrated transport system.

Still another advantage of the present invention is that an integrated transport system is provided that can increase the available space on a main deck of an aircraft.

Yet another advantage of the present invention is that an integrated transport system is provided that can preserve the payload capacity of a lower lobe or a cargo bay of an aircraft.

Still another advantage of the present invention is that an integrated transport system is provided that can be manually operated for eliminating the power requirements, the maintenance costs, and the likelihood of malfunctions, which are typically associated with automated transport systems.

The features, functions, and advantages can be achieved independently and in various embodiments of the present invention or may be combined in yet other embodiments.

BRIEF DESCRIPTION OF DRAWINGS

For a more complete understanding of this invention, reference should now be made to the embodiments illustrated in greater detail in the accompanying drawings and described below by way of examples of the invention.

DETAILED DESCRIPTION

In the following figures the same reference numerals are utilized for designating the same or similar components in the various views. Moreover, the illustrated embodiments described herein employ features where the context permits, e.g. when a specific result or advantage of the claimed invention is desired. In particular, the embodiments described herein implement an integrated transport system for moving a galley meal cart or a galley refreshment cart between an overhead sub-module and a main-deck sub-module of a bi-level galley module that is installed in an aircraft. However, it is contemplated that the integrated transport system can be utilized for various other suitable vehicles, dwellings, and other environments that require overhead storage. In this vein, a variety of other embodiments are contemplated having different combinations of the described features, having features other than those described herein, or even lacking one or more of those features. For these reasons, it is understood that the invention can be carried out in various other suitable modes.

Figure 1:
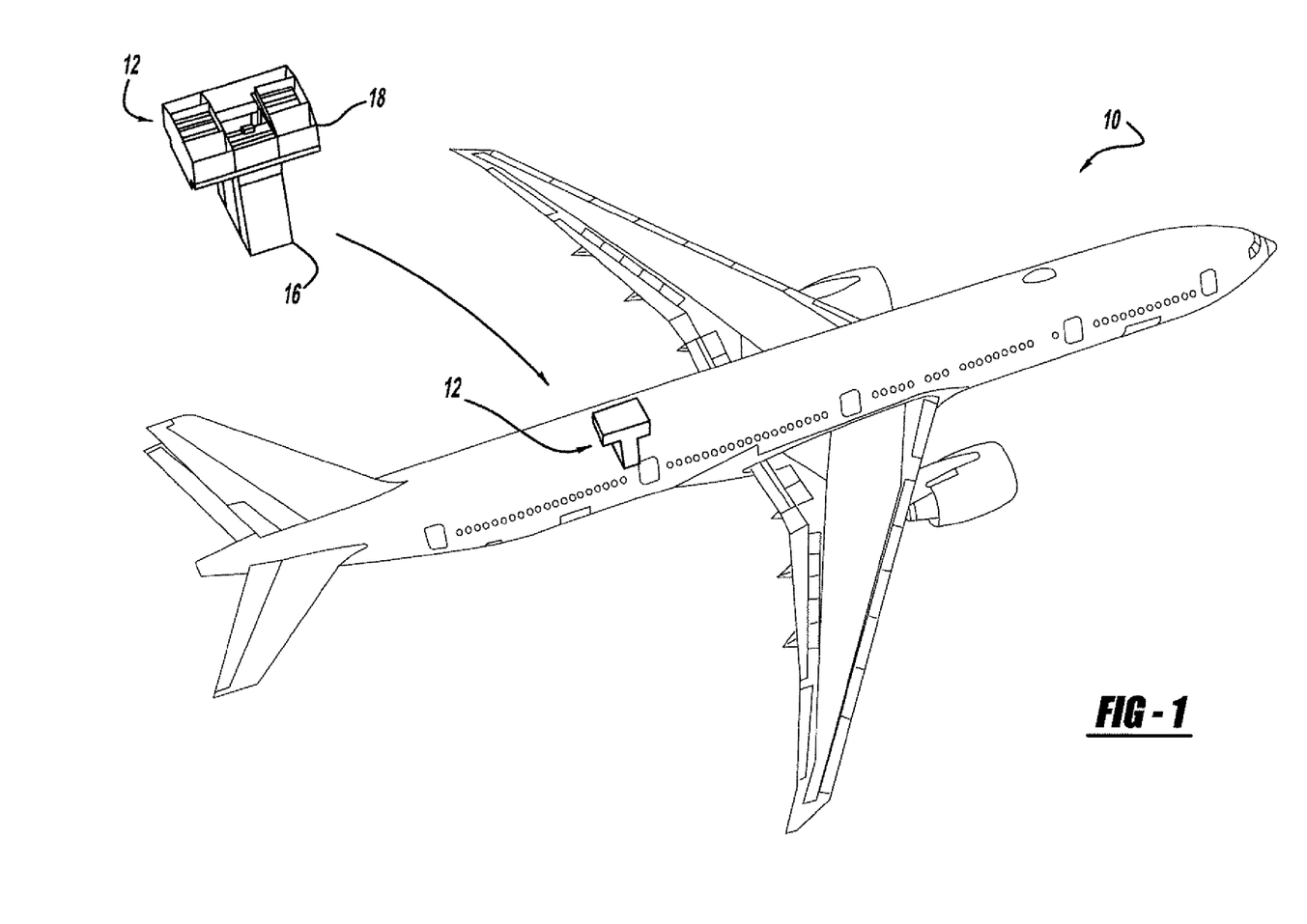
FIG. 1 is a perspective view of an aircraft having a bi-level module with an integrated transport system, according to one advantageous embodiment of the claimed invention.

Referring to FIG. 1, there is shown a commercial airplane 10 having a bi-level galley module 12 with an integrated transport system 14 (best shown in FIGS. 4A–4D), according to one advantageous embodiment of the invention. With attention to FIG. 2, the bi-level galley module 12 includes a main-deck sub-module 16 (best shown in FIG. 3A) and an overhead sub-module 18 (best shown in FIG. 3B) that is disposed above the main-deck sub-module 16. However, it will be appreciated that the airframe of the airplane 10 can instead define a bi-level galley module 12 in various other suitable constructions besides a modular one.

Figure 2:
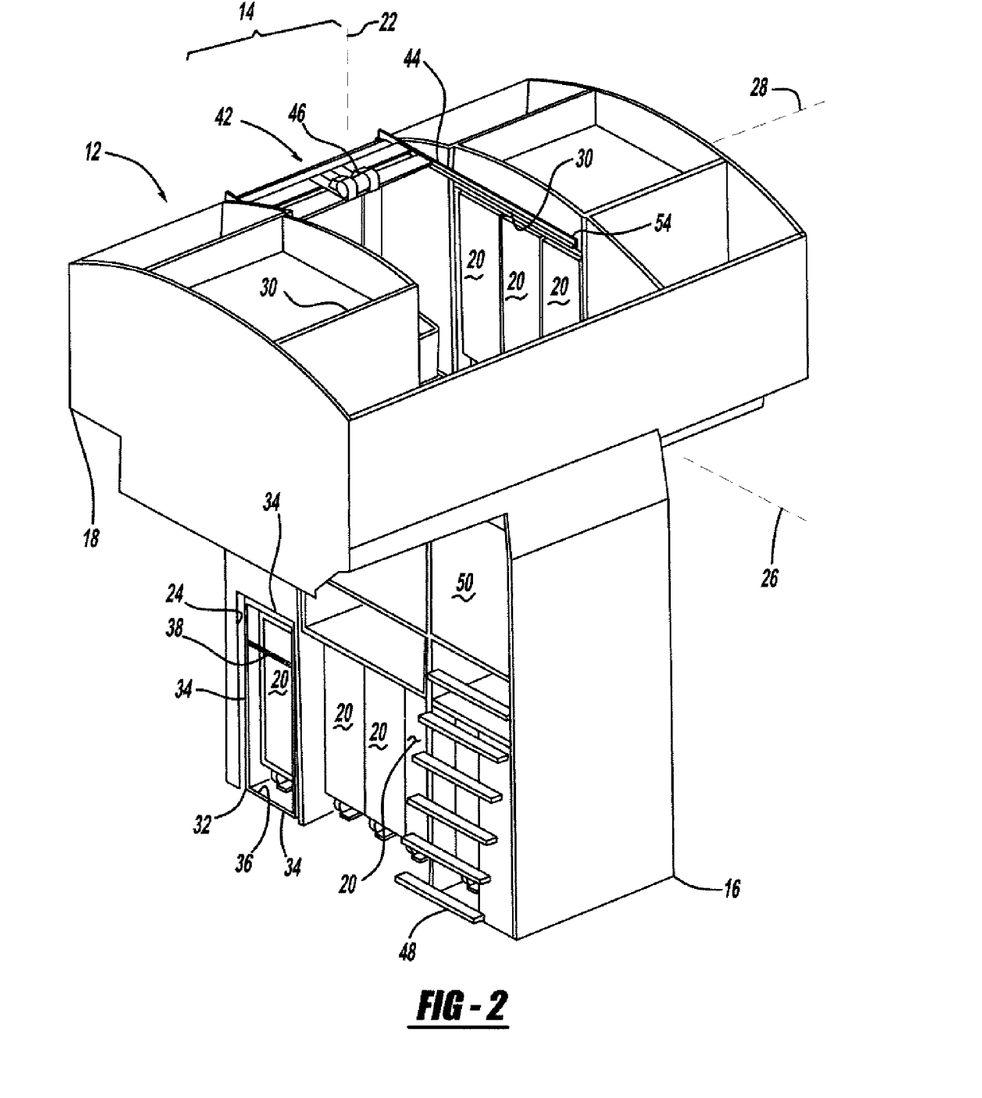
FIG. 2 is a perspective view of the bi-level galley module shown in FIG. 1.
Figure 3A:
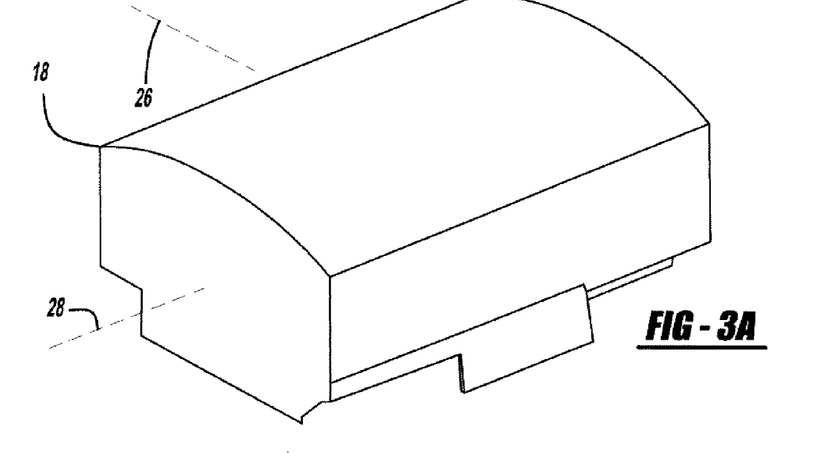
FIG. 3A is a perspective view of an overhead sub-module of the bi-level galley module shown in FIG. 2.
Figure 3B:
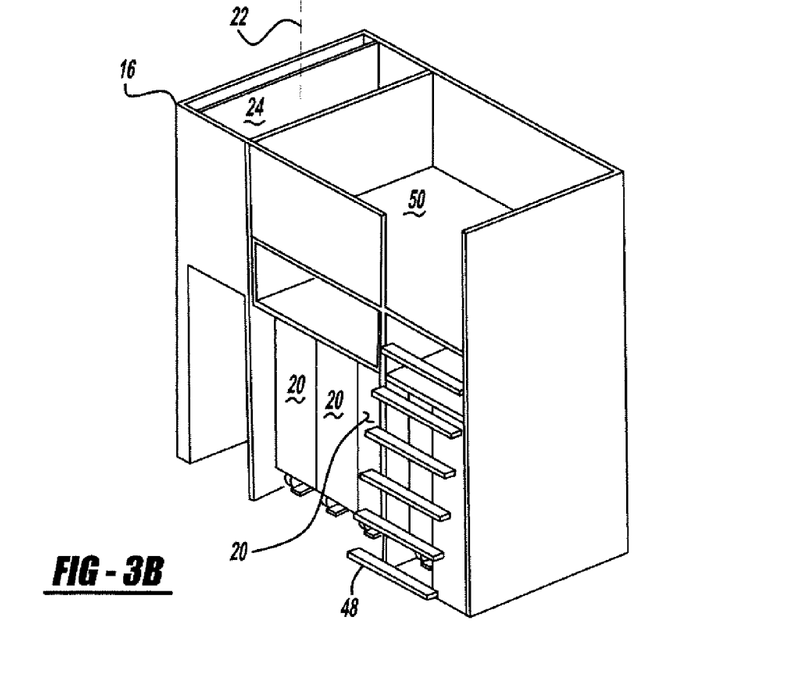
FIG. 3B is a perspective view of a main-deck sub-module of the bi-level galley module shown in FIG. 2.

The bi-level galley module 12 is utilized for storing a series of galley carts 20 in the main-deck sub-module 16 and/or the overhead sub-module 18. In this way, the bi-level galley module 12 can store about twice as many galley carts 20 as a single-level galley module having a similarly sized perimeter. This feature is beneficial because it can decrease the overall number of galleys in the airplane and increase the amount of available space on the main deck. One skilled in the art will understand that this additional space can be utilized for hosting additional passenger seats, maintaining the same number of passenger seats while increasing their size, increasing the room for the passengers and the crewmembers to move about the airplane 10, providing various other advantages, or any combination thereof. In addition, it will be appreciated that this bi-level galley module 12 does not occupy any space in the lower lobe or cargo bay of the airplane 10. In his regard, the bi-level galley module 12 is further beneficial for preserving the payload capacity of the airplane 10. For these reasons, it is understood that the integrated transport system 14 can improve the efficiency of the airplane 10 as a vehicle for transporting persons, luggage, and various other items. It is also understood that the bi-level galley module 12 can store various other suitable objects besides galley carts 20 as desired.

Figure 4A:
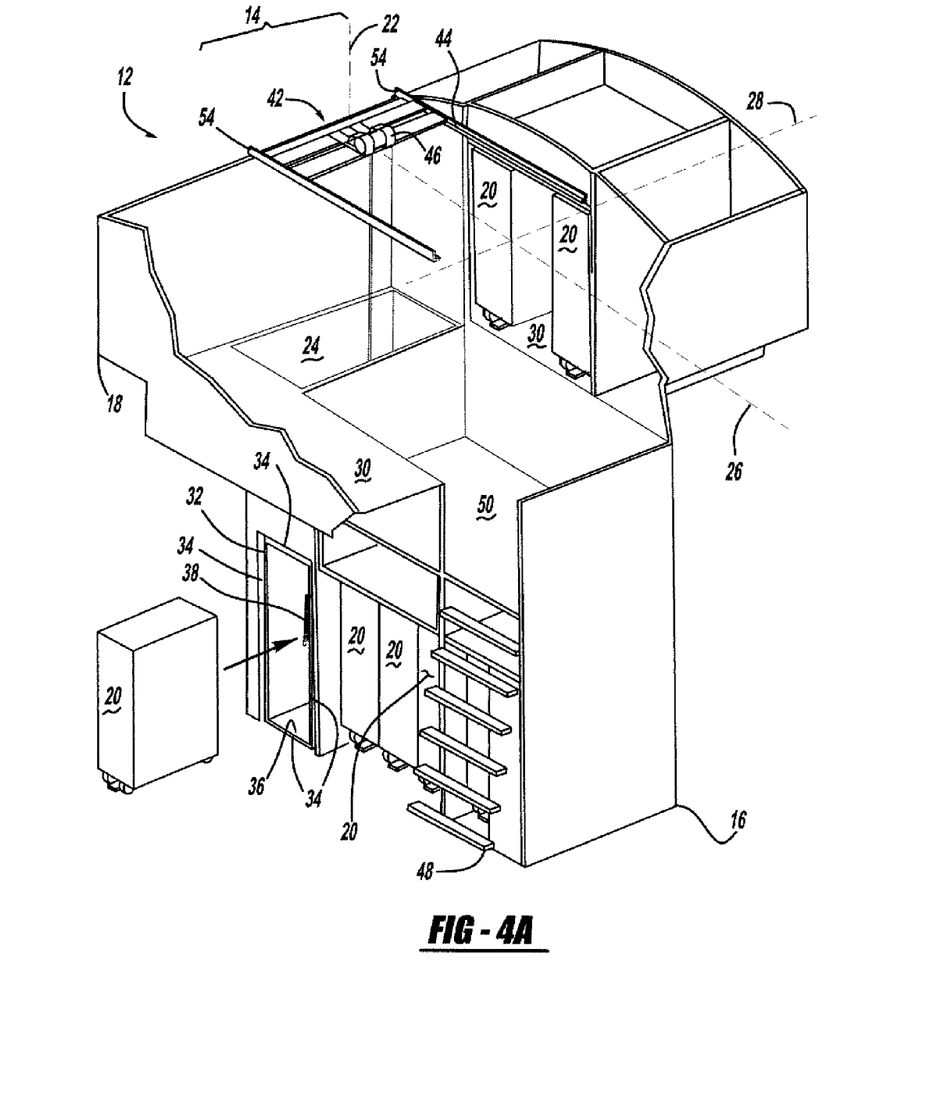
FIGS. 4A–4D are partially cutaway perspective views of the bi-level galley module shown in FIG. 2, sequentially illustrating the integrated transport system moving a galley cart from the main-deck sub-module to the overhead sub-module for storage therein.
Figure 4B:
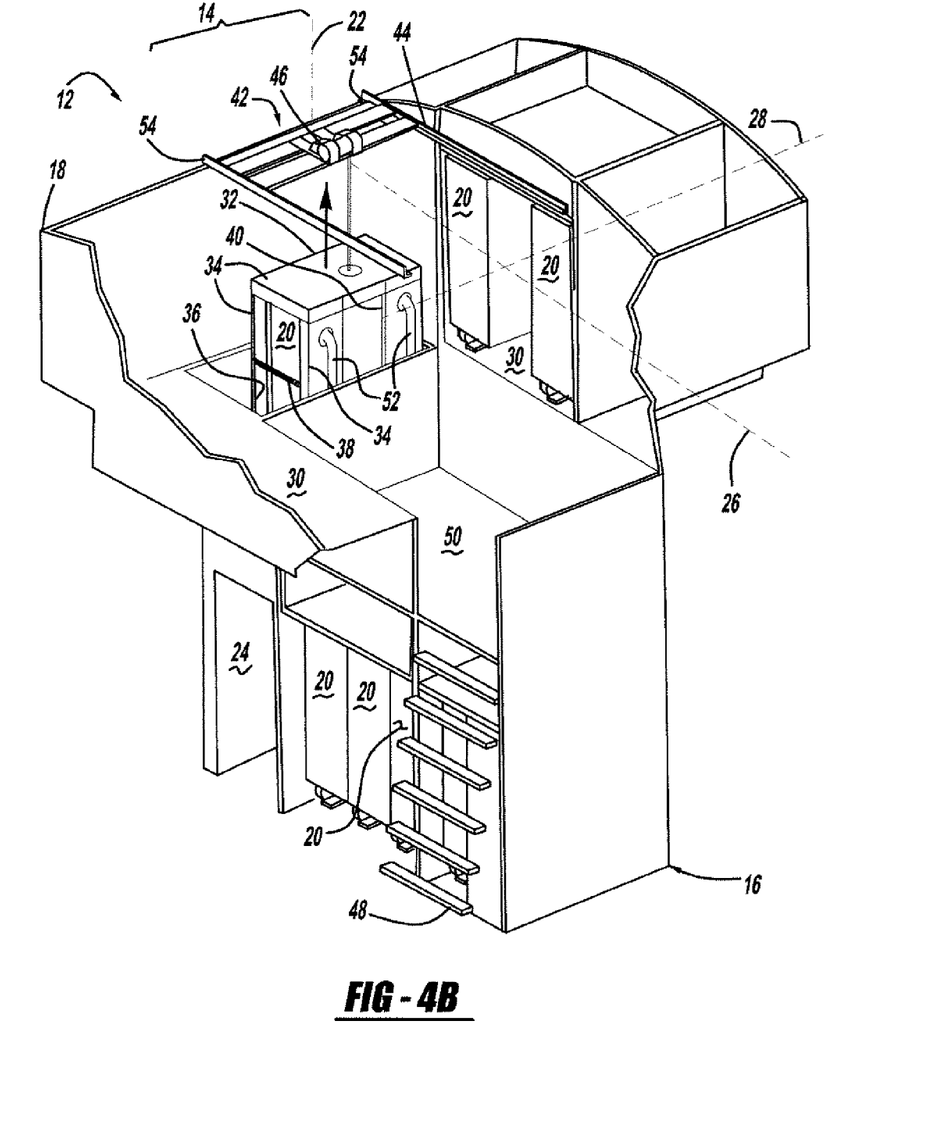
Figure 4C:
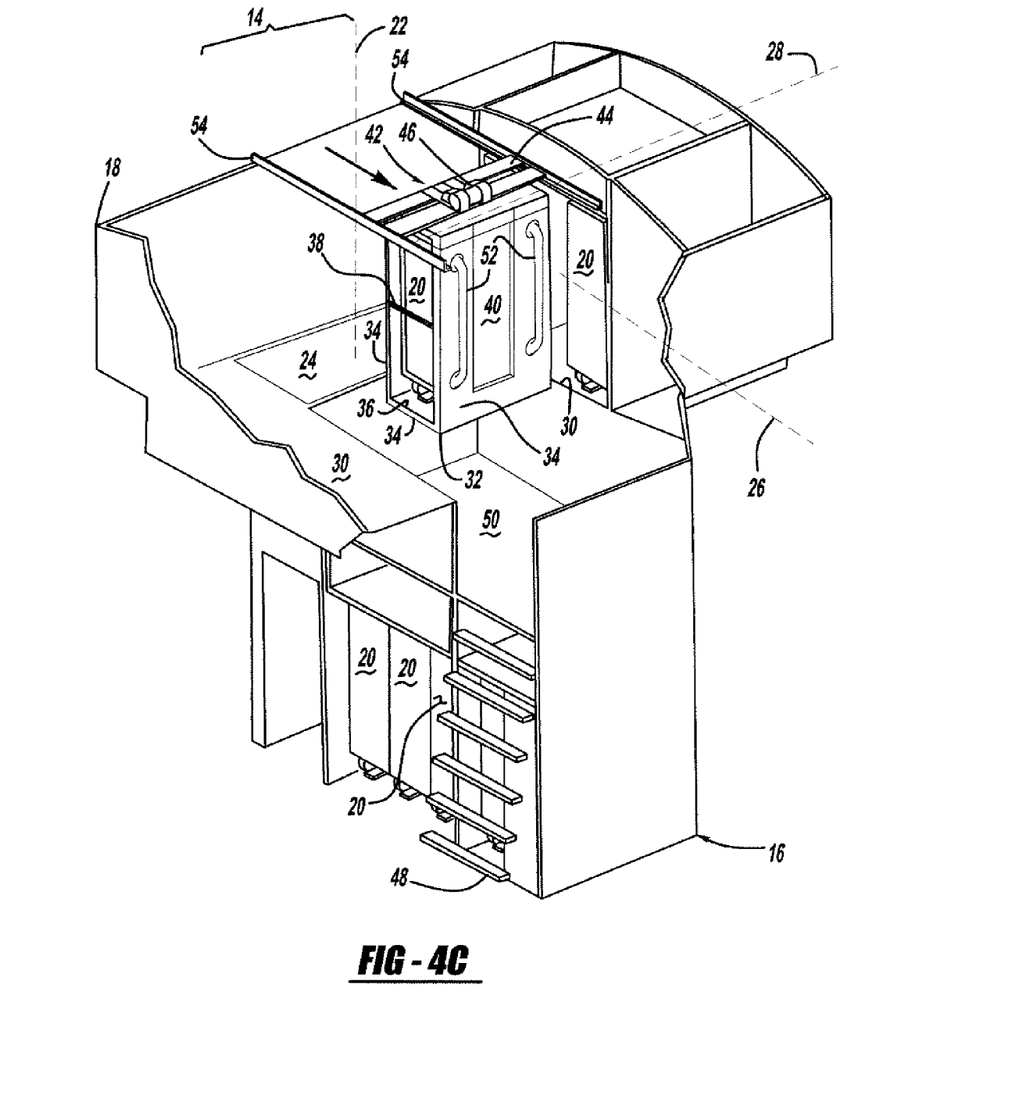
Figure 4D:
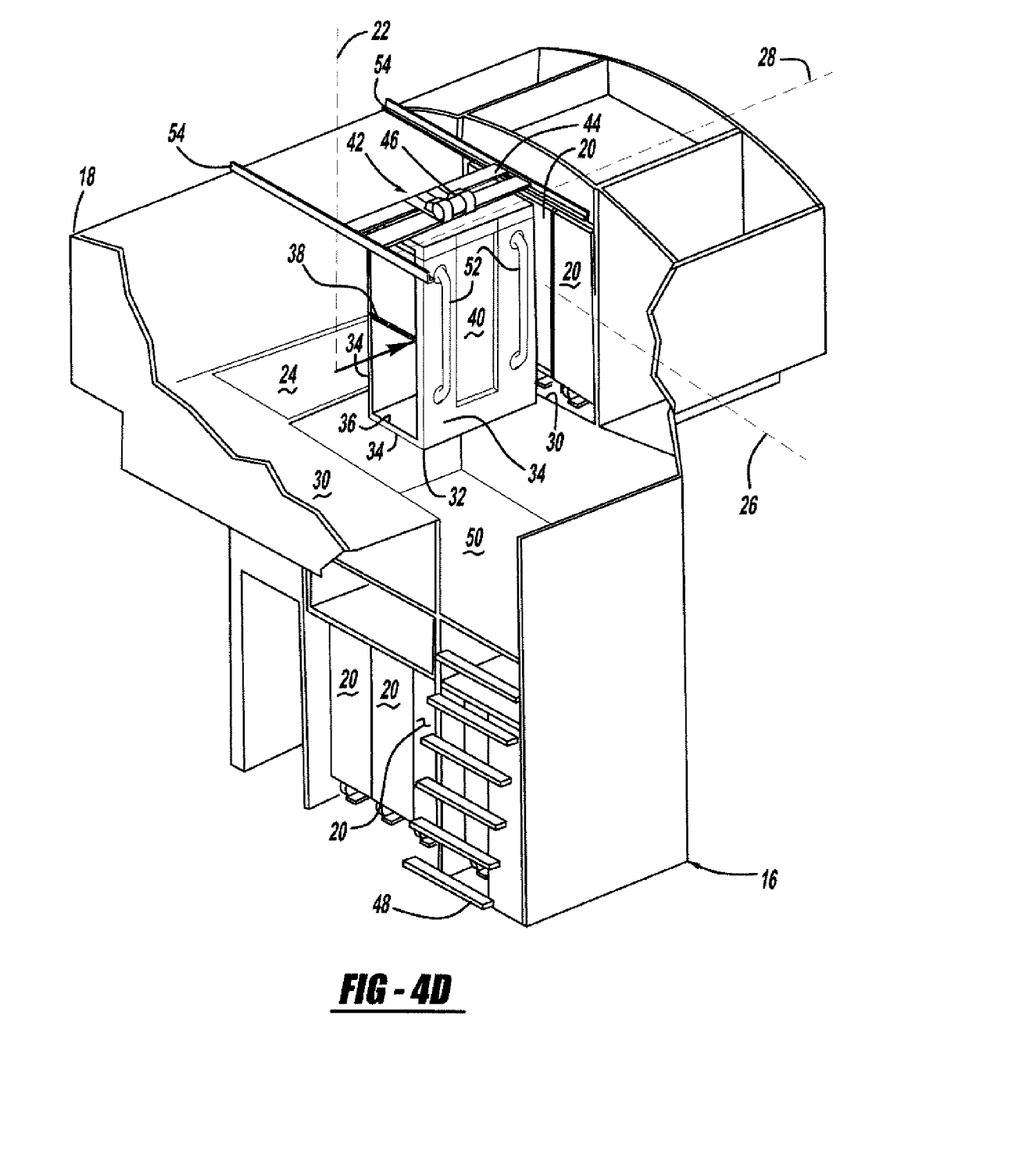

Referring now to FIGS. 4A–4D, there generally is shown the sequential operation of the integrated transport system 14 for storing a galley cart 20 in the overhead sub-module 18. Specifically, FIG. 4A shows a crewmember securing the galley cart 20 to the integrated transport system 14. Furthermore, FIG. 4B illustrates the integrated transport system 14 moving the galley cart 20 upward generally along a longitudinal axis 22 of a shaft 24, which extends between the main-deck sub-module 16 and the overhead sub-module 18. Additionally, FIG. 4C shows the integrated transport system 14 moving the galley cart 20 along a first lateral axis 26 of the overhead sub-module 18. Finally, FIG. 4D illustrates the integrated transport system moving the galley cart 20 generally along a second lateral axis 28 for placing the galley cart 20 in a storage area 30 of the overhead sub-module 18.

Referring back to FIG. 4A, the integrated transport system 14 includes an object carrier 32 for receiving the galley cart 20. This object carrier 32 includes one or more restraint members for securing the galley cart 20 to the object carrier 32 and preventing the galley cart 20 from tipping over or otherwise falling from the object carrier 32. This feature is advantageous because it can substantially improve the safety of storing, retrieving, or otherwise transporting galley carts, which can weigh in up to 250 pounds or more.

In this embodiment, the restraint members are a series of interconnected plate members 34, which form a box construction defining the object carrier 32. These plate members 34 are integral parts of the one-piece box construction. However, it will be appreciated that the plate members 34 can be separate components welded or otherwise fastened together by suitable fasteners. Furthermore, it is also contemplated that the restraint members can instead be netting members, belt members, rope members, or any combination thereof as desired. In addition, it is also understood that the object carrier can have other suitable shapes besides a box construction.

The box construction includes two opposing open faces 36 for allowing the galley cart 20 to enter or exit the object carrier 32. One or more rope members 38 can be secured across the open faces 36 via suitable fasteners, e.g. hook and loop, for preventing the galley cart 20 from moving out of the object carrier 32. Furthermore, as detailed in the description got FIG. 4D, one or more of the plate members 34 has one or more openings 40 formed therethrough for allowing a crewmember to reach into the object carrier 32, grab hold of the galley cart 20, and manually force the galley cart 20 out of the object carrier 32. It will also be appreciated that these openings 40 can decrease the amount of material comprising the object carrier 32 thereby decreasing the material costs of the object carrier 32, and minimizing the amount of weight ultimately carried by the airplane 10.

Referring now to FIG. 4B, the single-unit gantry-lift device 42 further includes a lift device 46 coupled to the object carrier 32 for raising and lowering the object carrier 32 along the longitudinal axis 22 of the shaft 24. In this way, the object carrier 32 and the galley cart 20 contained therein can be moved between the main-deck sub-module 16 and the overhead sub-module 18. This lift device 46 is a motorized pulley mechanism. However, it is contemplated that the lift device 46 can instead be a screw mechanism, a belt mechanism, manually operated or otherwise, or any combination thereof as desired.

Moreover, the single-unit gantry-lift device 42 further includes a gantry device 44, which is coupled to the lift device 46. As best shown in FIG. 4C, this gantry device 44 is utilized for moving the lift device 46 and the object carrier 32 along the first axis 26 of the overhead sub-module 18 to a point adjacent to an open or available section of the storage area 30. Specifically, a crewmember can climb a ladder 48, enter the overhead sub-module 18 via a walkway 50 in the overhead sub-module 18, grab hold of one or more handles 52 extending from the object carrier 32, and pull the object carrier 32 along the first axis 26. In this way, the crew member can utilize the gantry device 44 for moving the galley cart 20 next to its final destination in the storage area 30.

To that end, the gantry device 44 includes a pair of rails 54, which is mounted to the overhead sub-module 18 via bolt fasteners or other suitable fasteners. These rails 54 are utilized for suspending the lift device 46 and the object carrier 32 therefrom and preventing the object carrier 32 from tipping and casing the galley cart 20 to fall from the object carrier 32. Moreover, in accordance with the aforementioned, each rail 54 is substantially aligned with the first axis 26 of the overhead sub-module 18 for moving the lift device 46 and the object carrier 32 along the first axis 26 of the overhead sub-module 18.

Figure 5A:
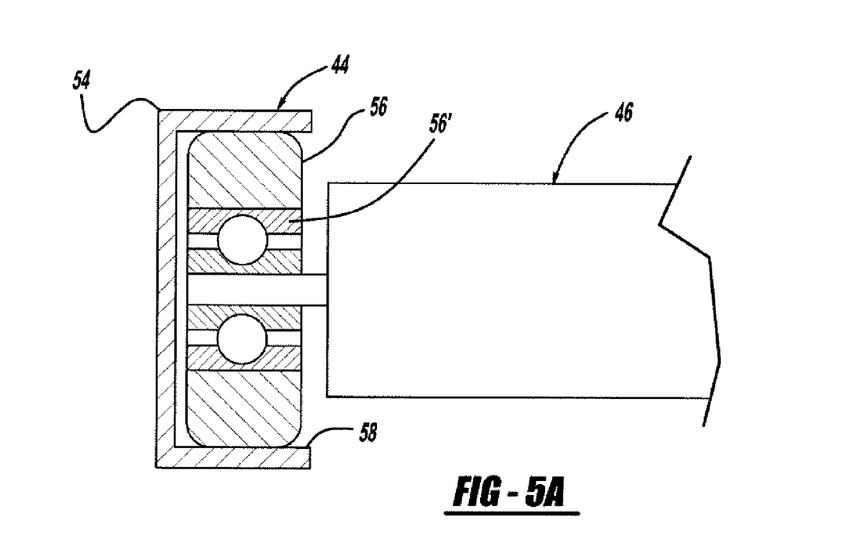
FIG. 5A is a cross-sectional view of a gantry device of the integrated transport system, shown in FIGS. 4A–4D.

As best shown in FIG. 5A, these rails 54 and the lift device 46 have two or more rolling members 56 coupled therebetween. These rolling members 56 are conventional wheels that are secured within a track 58 defined by each rail 54. Each wheel and each respective rail 54 have a ball-bearing coupling 56" therebetween for minimizing the force required to move the lift device 46 and the object carrier 32 along the rails 54. However, it is understood that other suitable rotatable couplings can be utilized as desired. In this respect, a fifth-percentile female can apply a substantially low force for moving the lift device 46, the object carrier 32, and a substantially heavy galley cart 20 along the first axis 26.

Figure 5B:
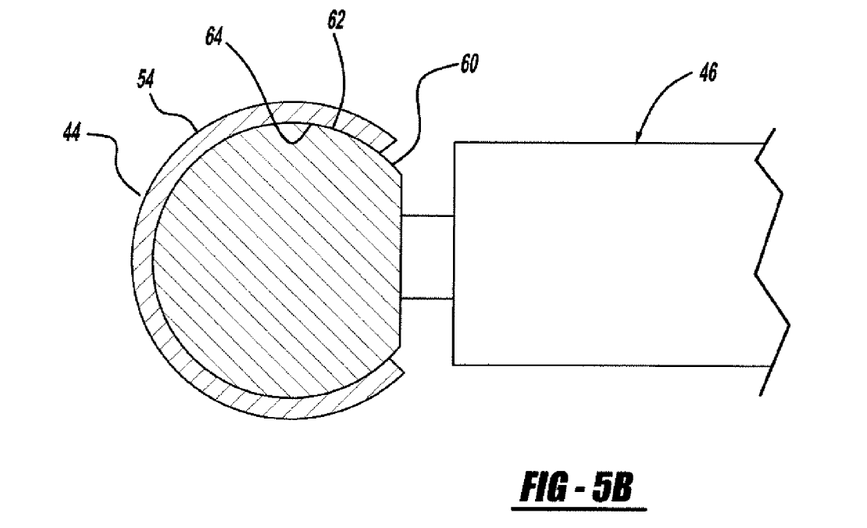
FIG. 5B is a cross-sectional view of a gantry device of the integrated transport system, shown in FIGS. 4A–4D, according to another advantageous embodiment of the invention.

In another embodiment shown in FIG. 5B, the rails 54 and the lift device 46 have one or more sliding members 60 coupled therebetween. These sliding members 60 are truncated tubes secured within the tracks 58. These truncated tubes have a cross-sectional shape that is substantially similar to the cross-section of the rail 54. Additionally, the outer surface 62 of the truncated tube and the inner surface 64 of the track 58 are sufficiently smooth for allowing the truncated tubes to slide substantially across the length of the rails 54. It is contemplated that a variety of other suitable low-friction couplings besides sliding members 60 or rolling members 56 can be utilized as desired.

As shown in FIG. 4D, the crewmember can reach through the opening 40 in the plate member 34, grab hold of the galley cart 20, and move the galley cart 20 along the second axis 28 between the object carrier 32 and the storage area 30 of the overhead sub-module 18.

Figure 6:
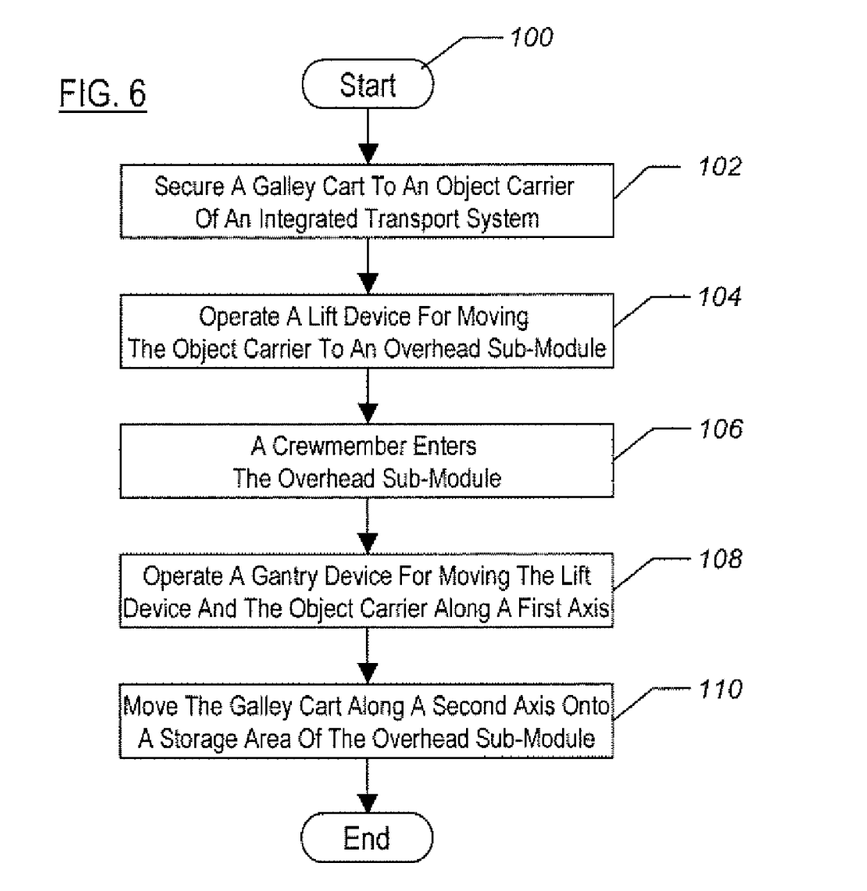
FIG. 6 is a logic flow diagram illustrating a method for operating the integrated transport system shown in FIGS. 4A–4D.

Referring now to FIG. 6, there is shown a logic flow diagram for a method for operating the integrated transport system 14 shown in FIGS. 4A–4D. The method begins in step 100 and then immediately proceeds to step 102.

In step 102, the galley cart 20 is secured to the object carrier 32. In this embodiment, this step is accomplished by rolling the galley cart 20 onto the object carrier 32 through an open face 36 of the box construction comprising the object carrier 32. As explained above, the object carrier 32 has one or more restraint members for securing the galley cart 20 to the object carrier 32. These restraint members are a series of interconnected plates 34, which define the object carrier 32 itself. Additionally, the restraint members include a rope member 38 is secured across the open face 36 to prevent the galley cart 20 from inadvertently rolling through the open face 36 and out of the object carrier 32. However, as explained above, the restraint members can be various other suitable mechanisms as desired. Then, the sequence proceeds to step 104.

In step 104, a crewmember operates the lift device 46 for moving the object carrier 32 and the galley cart 20 upward along the longitudinal axis 22 of the shaft 24. This lift device 46 is a motorized pulley mechanism with sufficient power for lifting the object carrier 32 and a substantially heavy galley cart 20. However, it is contemplated that the lift device 46 can be various other suitable mechanisms, motorized or manually operated, as described hereinabove. Then, the sequence proceeds to step 106.

In step 106, the crewmember climbs the ladder 48 and enters the overhead sub-module 18 via the walkway 50. This crewmember stands on the walkway 50 and waits for the object carrier 32 to arrive within the overhead sub-module 18. The sequence then proceeds to step 108.

In step 108, the crewmember operates the gantry device 44 for moving the lift device 46, the object carrier 32, and the galley cart 20 along the first axis 26 of the overhead sub-module 18. This gantry device 44 can be a manually operated device comprised of a pair of rails 54 mounted to the overhead sub-module and also attached to the lift device 46 via one or more sliding members 60 or rolling members 56. The gantry device 44 is manually operated. Specifically, the object carrier 32 includes one or more handles 52 for allowing the crew ember to move the object carrier 32, the galley cart 20, and the lift device 46 along the rails 54. In another embodiment, the gantry device 44 is a motorized device. The sequence then proceeds to step 110.

In step 110, the crewmember moves the galley cart 20 along the second axis 28 from the object carrier 32 to the open section of the storage area 30. This step is accomplished by the crewmember grabbing hold of the galley cart 20 through the opening 40 of the object carrier 32 and pushing or pulling the galley cart 20 onto the available section of the storage area 30. However, as exemplified above, this step can be accomplished by other suitable methods and/or mechanisms as desired.

It will be appreciated that a crewmember can retrieve a galley cart 20 from the storage area 30 by reversing the order of steps 100–110.

While particular embodiments of the invention have been shown and described, numerous variations and alternate embodiments will occur to those skilled in the art. Accordingly, it is intended that the invention be limited only in terms of the appended claims.

What is claimed is:

1. An integrated transport system for moving an object in an aircraft between a main cabin and an overhead cabin, the main cabin and the overhead cabin having a shaft in connection therebetween, comprising:
    a single-unit gantry-lift device including an object carrier with at least one restraint member for securing the object in said object carrier and preventing the object from tipping;
    said single-unit gantry-lift device further including a lift device and a gantry device;
    said lift device moving said object carrier generally along a longitudinal axis of the shaft;
    said gantry device moving said object carrier generally along at least one lateral axis of said overhead cabin;
    the object being at least one of a galley meal cart and a galley refreshment cart.

2. The integrated transport system recited in claim 1 wherein said main cabin is a main deck galley, said overhead cabin being an overhead galley.

3. The integrated transport system recited in claim 1 wherein said at least one restraint member is selected from the group consisting of at least one belt member, at least one plate member, at least one netting member, and at least one rope member.

4. The integrated transport system recited in claim 1 wherein said lift device is selected from the group consisting of a pulley mechanism, a screw mechanism, and a belt mechanism for moving said object carrier along said longitudinal axis of said shaft.

5. The integrated transport system recited in claim 1 wherein at least one of said lift device and said gantry device is a manually operated mechanism.

6. An integrated transport system for moving an object in an aircraft between a main cabin and an overhead cabin, the main cabin and the overhead cabin having a shaft in connection therebetween, comprising:
    a single-unit gantry-lift device including an object carrier with at least one restraint member for securing the object in said object carrier and preventing the object from tipping;
    said single-unit gantry-lift device further including a lift device and a gantry device;
    said lift device moving said object carrier generally along a longitudinal axis of the shaft;
    said gantry device moving said lift device and said object carrier generally along at least one lateral axis of said overhead cabin;
    said gantry device including a pair of rails coupled to said overhead cabin of said airframe;
    said pair of rails suspending said object carrier therefrom and preventing said object carrier from tipping;
    said pair of rails moving said object carrier generally along said at least one axis of said overhead cabin;
    at least one of said lift device and said gantry device being a manually operated mechanism.

7. The integrated transport system recited in claim 6 wherein said main cabin is a main deck galley, said overhead cabin being an overhead galley.

8. The integrated transport system recited in claim 6 wherein said at least one restraint member is selected from the group consisting of at least one belt member, at least one plate member, at least one netting member, and at least one rope member.

9. The integrated transport system recited in claim 6 wherein said lift device is selected from the group consisting of a pulley mechanism, a screw mechanism, and a belt mechanism for moving said object along said longitudinal axis of said shaft.

10. The integrated transport system recited in claim 6 wherein said pair of rails and said lift device have at least one of a rolling member and a sliding member coupled therebetween for moving said object carrier generally along said at least one lateral axis of said overhead cabin.

11. The integrated transport system recited in claim 6 wherein the object is at least one of a galley meal cart and a galley refreshment cart.

12. An aircraft comprising:
an airframe defining a main cabin, an overhead cabin above said main cabin, and a shaft extending therebetween;
said shaft having a longitudinal axis;
said overhead cabin storing at least one object therein and having at least one lateral axis; and
an integrated transport system moving an object between said main cabin and said overhead cabin;
said integrated transport system including an object carrier with at least one restraint member for securing said object in said object carrier;
said integrated transport system further including a single-unit gantry-lift device comprised of a lift device and a gantry device;
said lift device moving said object through said shaft generally along said longitudinal axis;
said gantry device moving said object generally along said at least one lateral axis of said overhead cabin.

13. The aircraft recited in claim 12 wherein said main cabin is a main deck galley, said overhead cabin being an overhead galley.

14. The aircraft recited in claim 12 wherein said at least one restraint member is selected from the group consisting of at least one belt member, at least one plate member, at least one netting member, and at least one rope member.

15. The aircraft recited in claim 12 wherein said lift device includes at least one of a pulley mechanism, a screw mechanism, and a belt mechanism for moving said object along said longitudinal axis of said shaft.

16. An aircraft comprising:
an airframe defining a main cabin, an overhead cabin above said main cabin, and a shaft extending therebetween;
said shaft having a longitudinal axis;
said overhead cabin storing at least one object therein and having at least one lateral axis; and
an integrated transport system moving an object between said main cabin and said overhead cabin;
said integrated transport system including an object carrier with at least one restraint member for securing said object in said object carrier;
said integrated transport system further including a single-unit gantry-lift device comprised of a lift device and a gantry device;
said lift device moving said object through said shaft generally along said longitudinal axis;
said gantry device moving said object generally along said at least one lateral axis of said overhead cabin;
said gantry device including a pair of rails coupled to said airframe in said overhead cabin;
said pair of rails suspending said object carrier therefrom, preventing said object carrier from tipping, and moving said object carrier generally along said at least one lateral axis of said overhead cabin.

17. The aircraft recited in claim 16 wherein said main cabin is a main deck galley, said overhead cabin being an overhead galley.

18. The aircraft recited in claim 16 wherein said at least one restraint member is selected from the group consisting of at least one belt member, at least one plate member, at least one netting member, and at least one rope member.

19. The aircraft recited in claim 16 wherein said lift device includes at least one of a pulley mechanism, a screw mechanism, and a belt mechanism for moving said object along said longitudinal axis of said shaft.

20. The aircraft recited in claim 16 wherein said pair of rails has at least one of a rolling member and a sliding member coupled thereto and extending from said lift device for moving said object carrier generally along said at least one lateral axis of said overhead cabin.

21. An aircraft comprising:
an airframe including a bi-level galley module with a main-deck sub-module and an overhead sub-module disposed above said main-deck sub-module;
said overhead su b-module storing at least one object therein and having at least one lateral axis;
a shaft defined by said bi-level galley module and extending between said main-deck sub-module and said overhead sub-module;
said shaft having a longitudinal axis perpendicular to said at least one lateral axis;
an integrated transport system moving said at least one object through said shaft and between said main-deck sub-module and said overhead sub-module;
said integrated transport system including a single-unit gantry-lift device comprised of a lift device and a gantry device;
said lift device moving said at least one object along said longitudinal axis;
said gantry device moving said object along said at least one lateral axis;
a ladder extending between said main-deck sub-module and said overhead sub-module for allowing ingress and egress to said overhead sub-module;
a walkway extending generally along said lateral axis of said overhead sub-module; and
at least one storage area adjacent to said walkway;
said single-unit gantry-lift device further including an object carrier with at least one restraint member for securing said at least one object in said object carrier;
said gantry device including a pair of rails coupled to said overhead sub-module;
said pair of rails suspending said object carrier therefrom, preventing said object carrier from tipping, and moving said object carrier generally along said at least one lateral axis of said overhead sub-module.

22. The aircraft recited in claim 21 wherein said at least one restraint member is selected from the group consisting of at least one belt member, at least one plate member, at least one netting member, and at least one rope member.

23. The aircraft recited in claim 21 wherein said lift device includes at least one of a pulley mechanism, a screw mechanism, and a belt mechanism for moving said object along said longitudinal axis of said shaft.

24. The aircraft recited in claim 21 wherein said pair of rails has at least one of a rolling member and a sliding member coupled thereto and extending from said lift device for moving said object carrier generally along said at least one lateral axis of said overhead galley.

25. A method for operating an integrated transport system for an aircraft with a main cabin, an overhead cabin disposed above the main cabin, and a shaft in connection between the main cabin and the overhead cabin, comprising:

securing an object to an object carrier of the integrated transport system;

actuating a lift device of a single-unit gantry-lift device for moving said object generally along a longitudinal axis of the shaft;

actuating a gantry device of said single-unit gantry-lift device for moving said object generally along at least one of a first axis of the overhead cabin; and     moving said object generally along a second axis disposed substantially perpendicular to said first axis;

wherein moving said object generally along said second axis comprises moving said object between said object carrier and a storage area in said overhead cabin.

26. The method in claim 25 wherein securing said object to said object carrier comprises:

coupling said object to said object carrier via at least one restraint member selected from the group consisting of at least one belt member, at least one plate member, at least one netting member, and at least one rope member.

27. The method in claim 25 wherein actuating said lift device comprises at least one of:

manually operating at least one of a pulley mechanism, a screw mechanism, and a belt mechanism for moving said object along said longitudinal axis of said shaft; and     actuating a motor for moving said object along said longitudinal axis of said shaft.

28. The method in claim 25 wherein actuating a gantry device comprises at least one of:

manually operating at least one of a rolling member and a sliding member for moving said object along said first axis of said overhead cabin; and     actuating a motor for moving said object along said first axis of said overhead cabin.

29. The method in claim 25 further comprising:

entering the overhead cabin via at least one of a ladder and a staircase extending between the main cabin and the overhead cabin.

\* \* \* \* \*